(12) United States Patent
Shimamura et al.

(10) Patent No.: US 10,358,708 B2
(45) Date of Patent: Jul. 23, 2019

(54) HIGH STRENGTH STEEL PLATE HAVING LOW YIELD RATIO EXCELLENT IN TERMS OF STRAIN AGEING RESISTANCE, METHOD OF MANUFACTURING THE SAME AND HIGH STRENGTH WELDED STEEL PIPE MADE OF THE SAME

(71) Applicant: JFE Steel Corporation, Tokyo (JP)

(72) Inventors: Junji Shimamura, Tokyo (JP); Kimihiro Nishimura, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 1159 days.

(21) Appl. No.: 14/388,842

(22) PCT Filed: Mar. 29, 2013

(86) PCT No.: PCT/JP2013/002158
§ 371 (c)(1),
(2) Date: Sep. 29, 2014

(87) PCT Pub. No.: WO2013/145771
PCT Pub. Date: Oct. 3, 2013

(65) Prior Publication Data
US 2015/0090370 A1     Apr. 2, 2015

(30) Foreign Application Priority Data
Mar. 29, 2012  (JP) ................. 2012-075667

(51) Int. Cl.
  *C22C 38/58*  (2006.01)
  *C21D 8/02*  (2006.01)
  (Continued)

(52) U.S. Cl.
  CPC .............. *C22C 38/58* (2013.01); *B23K 9/025* (2013.01); *B23K 9/18* (2013.01); *B23K 9/23* (2013.01);
  (Continued)

(58) Field of Classification Search
  CPC ....... C22C 38/58; C22C 38/04; C21D 8/0263; C21D 2211/002
  See application file for complete search history.

(56) References Cited

U.S. PATENT DOCUMENTS 6,322,642 B1 * 11/2001 Bocquet .................. C21D 9/50
                                                      148/333
2005/0106411 A1 * 5/2005 Ishikawa .............. C21D 8/0226
                                                      428/683
(Continued)

FOREIGN PATENT DOCUMENTS

CA       2775043        4/2011
EP       2 395 122      12/2011
(Continued)

OTHER PUBLICATIONS

Canadian Office Action dated Nov. 7, 2016, of corresponding Canadian Application No. 2,868,593.
(Continued)

*Primary Examiner* — Colleen P Dunn
*Assistant Examiner* — Jeremy C Jones
(74) *Attorney, Agent, or Firm* — DLA Piper LLP (US)

(57) ABSTRACT

A steel plate has a chemical composition containing, by mass %, C: 0.03% or more and 0.08% or less, Si: 0.01% or more and 1.0% or less, Mn: 1.2% or more and 3.0% or less, P: 0.015% or less, S: 0.005% or less, Al: 0.08% or less, Nb: 0.005% or more and 0.07% or less, Ti: 0.005% or more and 0.025% or less, N: 0.010% or less, O: 0.005% or less and the balance being Fe and inevitable impurities, a structure being a dual-phase structure consisting of a bainite phase and island martensite, wherein the area fraction of the island martensite is 3% to 15%, the equivalent circle diameter of the island martensite is 3.0 μm or less, and the remainder of the structure is a bainite phase.

8 Claims, 1 Drawing Sheet

(51) Int. Cl.

| | | |
|---|---|---|
| *C21D 8/10* | (2006.01) | |
| *C21D 9/08* | (2006.01) | |
| *C21D 9/46* | (2006.01) | |
| *C22C 38/00* | (2006.01) | |
| *C22C 38/02* | (2006.01) | |
| *C22C 38/04* | (2006.01) | |
| *C22C 38/06* | (2006.01) | |
| *C22C 38/08* | (2006.01) | |
| *C22C 38/12* | (2006.01) | |
| *C22C 38/14* | (2006.01) | |
| *C22C 38/16* | (2006.01) | |
| *C22C 38/26* | (2006.01) | |
| *C22C 38/38* | (2006.01) | |
| *C22C 38/42* | (2006.01) | |
| *C22C 38/44* | (2006.01) | |
| *C22C 38/46* | (2006.01) | |
| *C22C 38/48* | (2006.01) | |
| *C22C 38/50* | (2006.01) | |
| *C21D 9/50* | (2006.01) | |
| *C22C 38/18* | (2006.01) | |
| *B23K 9/025* | (2006.01) | |
| *B23K 9/18* | (2006.01) | |
| *B23K 9/23* | (2006.01) | |
| *B23K 31/02* | (2006.01) | |
| *C22C 38/28* | (2006.01) | |
| *C22C 38/40* | (2006.01) | |
| *B23K 101/06* | (2006.01) | |
| *B23K 101/10* | (2006.01) | |
| *B23K 103/04* | (2006.01) | |

(52) U.S. Cl.
CPC .......... *B23K 31/027* (2013.01); *C21D 8/0263* (2013.01); *C21D 9/08* (2013.01); *C21D 9/50* (2013.01); *C22C 38/001* (2013.01); *C22C 38/002* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/18* (2013.01); *C22C 38/26* (2013.01); *C22C 38/28* (2013.01); *C22C 38/38* (2013.01); *C22C 38/40* (2013.01); *C22C 38/42* (2013.01); *C22C 38/44* (2013.01); *C22C 38/46* (2013.01); *C22C 38/48* (2013.01); *C22C 38/50* (2013.01); *B23K 2101/06* (2018.08); *B23K 2101/10* (2018.08); *B23K 2103/04* (2018.08); *C21D 8/02* (2013.01); *C21D 8/105* (2013.01); *C21D 9/46* (2013.01); *C21D 2211/002* (2013.01); *C21D 2211/008* (2013.01)

(56) References Cited

U.S. PATENT DOCUMENTS

| | | | | |
|---|---|---|---|---|
| 2009/0107588 | A1* | 4/2009 | Allain | C21D 1/19 |
| | | | | 148/547 |
| 2010/0307644 | A1* | 12/2010 | Gil Otin | C21D 8/02 |
| | | | | 148/546 |
| 2010/0326559 | A1* | 12/2010 | Ishikawa | C21D 8/0226 |
| | | | | 138/171 |
| 2012/0018028 | A1* | 1/2012 | Shimamura | B21C 37/08 |
| | | | | 138/142 |
| 2013/0039803 | A1 | 2/2013 | Takaoka et al. | |
| 2015/0090370 | A1 | 4/2015 | Shimamura et al. | |

FOREIGN PATENT DOCUMENTS

| | | | | |
|---|---|---|---|---|
| JP | 55-041927 | A | 3/1980 | |
| JP | 55-097425 | A | 7/1980 | |
| JP | 01-176027 | A | 7/1989 | |
| JP | 2005-060839 | | 3/2005 | |
| JP | 2005-060840 | | 3/2005 | |
| JP | 4066905 | | 1/2008 | |
| JP | 2008-248328 | | 10/2008 | |
| JP | 2009-235524 | | 10/2009 | |
| JP | 2010-100903 | | 5/2010 | |
| JP | WO 2010090349 | A1 * | 8/2010 | ............ B21C 37/08 |
| JP | 2011-094230 | | 5/2011 | |
| JP | 2012-031509 | | 2/2012 | |
| JP | 2012-126925 | | 7/2012 | |
| JP | 5516785 | | 4/2014 | |
| WO | 2011/142172 | | 11/2011 | |

OTHER PUBLICATIONS

Supplementary European Search Report dated Jul. 17, 2015 of corresponding European Application No. 13768567.3.
Canadian Office Action dated Jan. 21, 2016 of corresponding Canadian Application No. 2,868,593.
European Communication dated Dec. 15, 2017, of corresponding European Application No. 13768567.3.

* cited by examiner

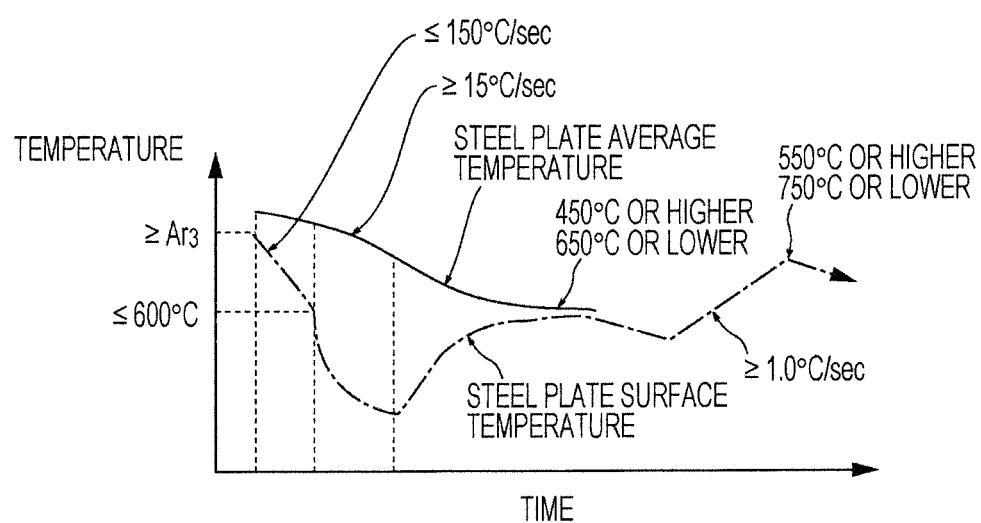

HIGH STRENGTH STEEL PLATE HAVING LOW YIELD RATIO EXCELLENT IN TERMS OF STRAIN AGEING RESISTANCE, METHOD OF MANUFACTURING THE SAME AND HIGH STRENGTH WELDED STEEL PIPE MADE OF THE SAME

TECHNICAL FIELD

This disclosure relates to a steel plate having a low yield ratio, high strength and high toughness preferably used mainly in a linepipe field, a method of manufacturing the steel plate and a high strength steel pipe. In particular, the disclosure relates to a steel plate having a low yield ratio, high strength and high toughness excellent in terms of strain ageing resistance, a method of manufacturing the steel plate and a high strength welded steel pipe excellent in terms of buckling resistance and ductility which is made of the steel plate.

BACKGROUND

Nowadays, steel materials for welded structures are required to have not only high strength and high toughness, but also a low yield ratio and high uniform elongation from the viewpoint of earthquake resistance. Generally, it is known that, by forming a metallographic structure of a steel material in which hard phases such as a bainite phase (hereinafter, also referred to as β) and a martensite phase (hereinafter, also referred to as M) are appropriately dispersed in a ferrite phase (hereinafter, referred to as α) which is a soft phase, it is possible to achieve a decrease in the yield ratio of the steel material and an increase in the uniform elongation of the steel material.

As an example of manufacturing methods of forming a microstructure in which hard phases are appropriately dispersed in a soft phase as described above, a certain method is described in Japanese Unexamined Patent Application Publication No. 55-97425. That is, JP '425 discloses a heat treatment method in which, as an intermediate treatment between quenching (hereinafter, also referred to as Q) and tempering (hereinafter, also referred to as T), quenching starting from a temperature range for forming a dual phase consisting of a ferrite phase and an austenite phase (hereinafter, also referred to as γ) is performed (hereinafter, also referred to as Q').

Japanese Unexamined Patent Application Publication No. 55-41927 discloses an example of a method which does not require an additional manufacturing process, in which, after rolling has been finished at a temperature equal to or higher than the $Ar_3$ transformation point, the start of accelerated cooling is delayed until the steel material has a temperature equal to or lower than the $Ar_3$ transformation point at which a ferrite phase is formed.

As an example of a technique with which it is possible to achieve a decrease in yield ratio without performing complicated heat treatments as disclosed in JP '425 and JP '927, Japanese Unexamined Patent Application Publication No. 1-176027 discloses a method with which a decrease in yield ratio is achieved by finishing rolling of a steel material at a temperature equal to or higher than the $Ar_3$ transformation point, and then by controlling an accelerated cooling rate and a cooling stop temperature to form a dual-phase structure consisting of an acicular ferrite phase and a martensite phase.

Moreover, Japanese Patent No. 4066905 discloses an example of a technique with which it is possible to achieve a low yield ratio and excellent toughness in a weld heat affected zone without significantly increasing the contents of alloying chemical elements of a steel material, in which, by controlling Ti/N and a Ca—O—S balance, a three-phase structure consisting of a ferrite phase, a bainite phase and island martensite (hereinafter, also referred to as MA) is formed.

In addition, Japanese Unexamined Patent Application Publication No. 2008-248328 discloses a technique in which a decrease in yield ratio and an increase in uniform elongation are achieved by adding alloying chemical elements such as Cu, Ni and Mo.

On the other hand, in a welded steel pipe used to form a linepipe such as a UOE steel pipe or an electric resistance welded steel pipe, after a steel plate has been subjected to cold forming into a cylindrical shape and the butted portions have been welded, usually, a coating treatment such as polyethylene coating or powder epoxy coating is performed on the outer surface of the resultant steel pipe from the viewpoint of, for example, corrosion protection. Therefore, there is a problem in that, since strain ageing occurs due to working strain applied when pipe forming is performed and due to heating when the coating treatment is performed, there is an increase in yield stress, which results in the yield ratio of the steel pipe being larger than that of the steel plate.

To solve the problem described above, for example, Japanese Unexamined Patent Application Publication Nos. 2005-60839 and 2005-60840 disclose steel pipes having a low yield ratio, high strength and high toughness excellent in terms of strain ageing resistance and methods of manufacturing the steel pipes utilizing the fine precipitations of complex carbides containing Ti and Mo or the fine precipitations of complex carbides containing two or all of Ti, Nb, and V.

In the heat treatment method according to JP '425, by appropriately selecting a quenching temperature in a range forming a dual phase, it is possible to achieve a decrease in yield ratio, but there is a problem in that there is a decrease in productivity and there is an increase in manufacturing cost due to an increase in the number of heat treatment processes.

In addition, in the technique according to JP '927, there is a problem in that, since it is necessary to perform cooling at a cooling rate equivalent to that of a natural cooling in a temperature range from a rolling finish temperature to an accelerated cooling start temperature, there is a significant decrease in productivity.

Moreover, in the technique according to JP '027, as indicated by the examples in the literature, there is a problem in that, since the carbon content or the contents of other alloying chemical elements of a steel plate are increased to obtain a steel material having a tensile strength of 490 $N/mm^2$ (50 $kg/mm^2$) or more, there is an increase in material cost, and, in addition to that, there is a decrease in toughness in a weld heat affected zone.

In addition, in the technique according to JP '905, the influence of, for example, a microstructure on uniform elongation which is required in use for, for example, a linepipe has not necessarily been clarified. In addition, since the low-temperature toughness of a base metal was evaluated only at a temperature of −10° C., it is not clear for a possibility of a new use application in which toughness at a lower temperature is required.

In the technique according to JP '328, since it is necessary that the steel plate has a chemical composition containing increased contents of alloying chemical elements, there is a problem in that there is an increase in material cost and, in addition to that, there is a decrease in toughness in a weld heat affected zone. In addition, the low-temperature toughness of a base metal and a weld heat affected zone are evaluated only at a temperature of −10° C.

In techniques according to JP '839 and 840, although there is an improvement in strain ageing resistance, the low-temperature toughness of a base metal and a weld heat affected zone are evaluated only at a temperature of −10° C.

Moreover, in JP '425, JP '927, JP '027, JP '905, JP '328, JP '839 and JP '840, it is necessary to form a ferrite phase, but the ferrite phase causes a decrease in tensile strength. Therefore, it is necessary to add alloying chemical elements to increase strength to an X60 grade or more according to the API standard, and there is concern that there may be an increase in alloy cost and there may be a decrease in low-temperature toughness.

Therefore, it could be helpful to provide a steel plate having a low yield ratio, high strength and high toughness excellent in terms of strain ageing resistance of an API 5Lx70 grade or less which can be manufactured at high productivity, a method of manufacturing the steel plate and a high strength welded steel pipe made of the steel plate.

SUMMARY

We thus provide:

[1] A high strength steel plate having a low yield ratio, the steel plate having a chemical composition containing, by mass %, C: 0.03% or more and 0.08% or less, Si: 0.01% or more and 1.0% or less, Mn: 1.2% or more and 3.0% or less, P: 0.015% or less, S: 0.005% or less, Al: 0.08% or less, Nb: 0.005% or more and 0.07% or less, Ti: 0.005% or more and 0.025% or less, N: 0.010% or less, O: 0.005% or less and the balance being Fe and inevitable impurities, a metallographic structure being a dual-phase structure consisting of a bainite phase and island martensite, in which the area fraction of the island martensite is 3% or more and 15% or less, in which the equivalent circle diameter of the island martensite is 3.0 μm or less, and in which the remainder of the metallographic structure is a bainite phase, a hardness variation in the thickness direction of ΔHV30 or less in terms of Vickers hardness, a hardness variation in the width direction of ΔHV30 or less in terms of Vickers hardness, a maximum hardness in the surface portions of the steel plate of HV230 or less in terms of Vickers hardness and a yield ratio of 85% or less and an elongation of 22% or more in a full-thickness tensile test using a test piece having a shape in accordance with GOST standards.

[2] The high strength steel plate having a low yield ratio according to item [1] above, the steel plate having the chemical composition further containing, by mass %, one or more selected from among Cu: 0.5% or less, Ni: 1% or less, Cr: 0.5% or less, Mo: 0.5% or less, V: 0.1% or less, Ca: 0.0005% or more and 0.003% or less and B: 0.005% or less.

[3] A method of manufacturing a high strength steel plate having a low yield ratio excellent in terms of strain ageing resistance, the method including heating steel having the chemical composition according to item [1] or [2] above at a temperature of 1000° C. or higher and 1300° C. or lower, performing hot rolling under conditions such that the cumulative rolling reduction ratio is 50% or more in a temperature range of 900° C. or lower, finishing hot rolling at a temperature equal to or higher than the $Ar_3$ transformation point, starting cooling at a temperature equal to or higher than the $Ar_3$ transformation point, performing cooling at a cooling rate of 150° C./sec. or less in terms of the surface temperature of the steel plate until the surface temperature becomes 600° C. or lower, performing cooling at a cooling rate of 15° C./sec. or more in terms of the average temperature of the steel plate until the average temperature becomes 450° C. or higher and 650° C. or lower, and, immediately after the cooling has been performed, performing reheating at a heating rate of 1.0° C./sec. or more in terms of the surface temperature of the steel plate until the surface temperature becomes 550° C. or higher and 750° C. or lower.

[4] A high strength welded steel pipe, the steel pipe being manufactured by forming the steel plate according to item [1] or [2] above into a cylindrical shape, by welding butted portions of the shaped cylinder under conditions such that single-layer welding is performed on each of the outer and inner surfaces, and by thereafter performing a pipe-expanding treatment under a condition of a pipe expanding ratio of 0.4% or more and 2.0% or less, and having a yield ratio of 90% or less and an elongation of 20% or more in a full-thickness tensile test using a test piece having a shape in accordance with GOST standards, and, further having a yield ratio of 90% or less and an elongation of 20% or more even after a strain ageing treatment has been performed under conditions such that the temperature is 250° C. or lower and the duration is 30 minutes or less.

A steel plate having a low yield ratio, high strength and high toughness excellent in terms of strain ageing resistance can be manufactured without decreasing toughness in a weld heat affected zone or adding a large amount of alloying chemical elements. Therefore, a steel plate which is used mainly for a linepipe can be stably manufactured in a large amount, and there is a significant increase in productivity and economic efficiency. Moreover, since a high strength welded steel pipe excellent in terms of buckling resistance and ductility can be manufactured using this steel plate, there is a significant industrial effect.

BRIEF DESCRIPTION OF THE DRAWING

FIG. 1 is a schematic diagram illustrating a thermal history to which a steel plate is subjected after accelerated cooling has been started, in which a solid line represents the average temperature of the steel plate and a dot-dash line represents the surface temperature of the steel plate.

DETAILED DESCRIPTION

We conducted investigations regarding a method of manufacturing a steel plate, in particular, regarding a manufacturing process including controlled rolling, accelerated cooling after controlled rolling has been performed and subsequent reheating. We found that, by controlling rolling conditions so that a bainite phase in the surface portion of the steel plate becomes soft, it is possible to achieve high deformation performance and high ductility without a significant decrease in strength, and obtained the following findings:

(a) By stopping accelerated cooling in the middle of bainite transformation of a steel plate, that is, in a temperature range in which a non-transformed austenite phase is present in an accelerated cooling process, and by subsequently starting reheating from a temperature higher than a temperature (hereinafter, referred to as a Bf point) at which bainite transformation finishes, the metallographic structure of the steel plate, in which hard island martensite (hereinafter, referred to as MA) is uniformly formed in a bainite phase, is formed, and thereby a decrease in yield ratio is achieved.

(b) By adding an appropriate amount of Mn to the chemical composition of steel as a chemical element for stabilizing an austenite phase, a non-transformed austenite phase become stabilized, and thus, it is possible to form hard MA without adding a large amount of chemical elements for increasing hardenability such as Cu, Ni, and Mo.

(c) By performing rolling under conditions such that the cumulative rolling reduction ratio is 50% or more in a temperature range of 900° C. or lower which is a no-recrystallization temperature range in austenite, fine MA can be uniformly dispersed, and thereby an increase in uniform elongation can be achieved, while a low yield ratio is maintained.

(d) Moreover, by appropriately controlling both the rolling conditions in the temperature range which is a no-recrystallization temperature range in austenite described in item (c) above and the reheating conditions described in item (a) above, the shape of MA can be controlled. That is, the grain size of MA can be controlled to be as small as 3.0 μm or less in terms of an average value of equivalent circle diameters. Then, as a result, since MA is only slightly decomposed even if steel is subjected to a thermal history which causes deterioration of a yield ratio due to ageing in the case of a conventional steel, the desired microstructure and properties can be maintained even after ageing has occurred.

(e) Moreover, by performing first stage cooling at a cooling rate of 150° C./sec. or less down to a temperature of 600° C. or lower, a bainite structure in the upper and lower surface portions can be softened. As a result, since there is a decrease in hardness in the upper and lower surface portions of a steel plate, high ductility can be achieved.

The reason for limitations on the features will be described hereafter.

1. Regarding Chemical Composition

First, the reason for the limitations on the chemical composition of the steel will be described. % used when describing a chemical composition always represents mass %.

C: 0.03% or more and 0.08% or less

C is a chemical element which contributes by forming carbide to precipitation strengthening and is important for forming MA. When the C content is less than 0.03%, the content is not sufficient to form MA and sufficient strength cannot be achieved. When the C content is more than 0.08%, there is a decrease in the toughness of a base metal and toughness in a weld heat affected zone (HAZ). Therefore, the C content is 0.03% or more and 0.08% or less, preferably 0.04% or more and 0.06% or less.

Si: 0.01% or more and 1.0% or less

Si is added to perform deoxidation. When the Si content is less than 0.01%, there is an insufficient effect of deoxidation and, when the Si content is more than 1.0%, there is a decrease in toughness and weldability. Therefore, the Si content is 0.01% or more and 1.0% or less, preferably 0.01% or more and 0.3% or less.

Mn: 1.2% or more and 3.0% or less

Mn is added to increase strength and toughness. Mn is also added to increase hardenability that promotes formation of MA. When the Mn content is less than 1.2%, these effects cannot be sufficiently obtained and, when the Mn content is more than 3.0%, there is a decrease in toughness and weldability. Therefore, the Mn content is 1.2% or more and 3.0% or less, preferably 1.8% or more and 3.0% or less to stably form MA regardless of variations in a chemical composition and manufacturing conditions.

P: 0.015% or less

P is an inevitable impurity, and the upper limit of the P content is specified. When the P content is large, there is a significant increase in the degree of central segregation, resulting in a decrease in the toughness of a base metal. Therefore, the P content is 0.015% or less, preferably 0.010% or less.

S: 0.005% or less

S is an inevitable impurity, and the upper limit of the S content is specified. When the S content is large, there is a significant increase in the amount of MnS formed, resulting in a decrease in the toughness of a base metal. Therefore, the S content is 0.005% or less, preferably 0.002% or less.

Al: 0.08% or less

Al is added as a deoxidation agent. When the Al content is more than 0.08%, there is a decrease in the cleanliness of steel, resulting in a decrease in toughness. Therefore, the Al content is 0.08% or less, preferably 0.01% or more and 0.08% or less, more preferably 0.01% or more and 0.05% or less.

Nb: 0.005% or more and 0.07% or less

Nb is a chemical element which increases toughness as a result of decreasing a grain size in a microstructure and contributes to an increase in strength due to an increase in hardenability through solid solute Nb. These effects are obtained when the Nb content is 0.005% or more. However, when the Nb content is more than 0.07%, there is a decrease in toughness in a weld heat affected zone, and thus the Nb content is 0.005% or more and 0.07% or less, more preferably 0.01% or more and 0.05% or less.

Ti: 0.005% or more and 0.025% or less

Ti is an important chemical element which increases the toughness of a base metal as a result of preventing an increase in the grain size of an austenite phase through the pinning effect of TiN when slab heating is performed. This effect is obtained when the Ti content is 0.005% or more. However, when the Ti content is more than 0.025%, there is a decrease in toughness in a weld heat affected zone, and thus the Ti content is 0.005% or more and 0.025% or less, preferably 0.005% or more and less than 0.02% from the view point of toughness in a weld heat affected zone, more preferably 0.007% or more and 0.016% or less.

N: 0.010% or less

N is treated as an inevitable impurity. Since there is a decrease in toughness in a weld heat affected zone when the N content is more than 0.010%, the N content is 0.010% or less, preferably 0.007% or less, more preferably 0.006% or less.

O: 0.005% or less

O is an inevitable impurity and the upper limit of the O content is specified. Since O causes formation of coarse inclusions which has a negative effect on toughness, the O content is 0.005% or less, more preferably 0.003% or less.

The basic chemical composition is as described above. Furthermore, to improve the strength and toughness of a steel plate and to increase hardenability to promote formation of MA, one or more of Cu, Ni, Cr, Mo, V, Ca, and B described below may be added.

Cu: 0.5% or less

Cu may be added since Cu contributes to an increase in the hardenability of steel when Cu is added. It is preferable that the Cu content be 0.05% or more to obtain this effect. However, when the Cu content is more than 0.5%, there is a decrease in toughness. Thus, when Cu is added, it is preferable that the Cu content be 0.5% or less, more preferably 0.4% or less.

Ni: 1% or less

Since Ni contributes to an increase in the hardenability of steel and, in particular, since there is not a decrease in toughness even when the Ni content is large, Ni may be added. It is preferable that the Ni content be 0.05% or more to obtain this effect. However, since Ni is an expensive chemical element, when Ni is added, it is preferable that the Ni content be 1% or less, more preferably 0.4% or less.

Cr: 0.5% or less

Since Cr is, like Mn, a chemical element effective in achieving sufficient strength even when the C content is low, Cr may be added. It is preferable that the Cr content be 0.1% or more to obtain this effect. However, since there is a decrease in weldability in the case where the Cr content is excessively large, when Cr is added, it is preferable that the Cr content be 0.5% or less, more preferably 0.4% or less.

Mo: 0.5% or less

Since Mo is a chemical element which increases hardenability, and since Mo is a chemical element which contributes to an increase in strength as a result of formation of MA and strengthening a bainite phase, Mo may be added. It is preferable that the Mo content be 0.05% or more to obtain this effect. However, when the Mo content is more than 0.5%, there is a decrease in toughness in a weld heat affected zone. Therefore, when Mo is added, it is preferable that the Mo content be 0.5% or less, more preferably 0.3% or less.

V: 0.1% or less

Since V is a chemical element which contributes to an increase in strength with an increase in hardenability, V may be added. It is preferable that the V content be 0.005% or more to obtain this effect. However, when the V content is more than 0.1%, there is a decrease in toughness in a weld heat affected zone. Therefore, when V is added, it is preferable that the V content be 0.1% or less, more preferably 0.06% or less.

Ca: 0.0005% or more and 0.003% or less

Since Ca is a chemical element which increases toughness as a result of controlling the shape of sulfide containing inclusions, Ca may be added. This effect is obtained when the Ca content is 0.0005% or more. When the Ca content is more than 0.003%, this effect becomes saturated and there is conversely a decrease in toughness as a result of decreasing cleanliness. Therefore, when Ca is added, it is preferable that the Ca content be 0.0005% or more and 0.003% or less, more preferably 0.001% or more and 0.003% or less.

B: 0.005% or less

Since B is a chemical element which contributes to an increase in strength and an increase in toughness in a weld heat affected zone, B may be added. It is preferable that the B content be 0.0005% or more to obtain these effects. However, when the B content exceeds 0.005%, there is a decrease in weldability. Therefore, when B is added, it is preferable that the B content be 0.005% or less, more preferably 0.003% or less.

Incidentally, by controlling the ratio of the Ti content and the N content Ti/N, it is possible to prevent an increase in the grain size of an austenite phase in a weld heat affected zone due to presence of TiN particles. Thus, it is possible to achieve good toughness in a weld heat affected zone. Therefore, it is preferable that Ti/N be 2 or more and 8 or less, more preferably 2 or more and 5 or less.

The remainder of the chemical composition other than those described above in a steel plate consists of Fe and inevitable impurities. However, as long as the desired effects are not decreased, chemical elements other than those described above may be added. For example, from the viewpoint of increasing toughness, Mg: 0.02% or less and/or REM (rare-earth metal): 0.02% or less may be added.

Subsequently, the metallographic structure will be described.

2. Regarding Metallographic Structure

The metallographic structure is controlled so that, in addition to a bainite phase, an island martensite (MA) is uniformly included in an amount of 3% or more and 15% or less in terms of area fraction.

By forming a duplex-phase structure serving as a main body of the structure, in which hard MA is included in a soft bainite phase, a decrease in yield ratio and an increase in uniform elongation are obtained.

When steel plates and steel pipes are used in earthquake regions or the like in which a large deformation is to be applied to these materials, there are some cases where these materials are required to have not only a low yield ratio but also high uniform elongation and high ductility. When a duplex-phase structure consisting of a soft bainite phase and hard MA as described above, a soft phase undergoes deformation. In addition, by controlling hardness variations in the thickness direction and in the width direction to be about ΔHV30 or less and a maximum hardness in the surface portions of the steel plate to be about HV230 or less, it is possible to achieve a high elongation of 22% or more in a full-thickness tensile test using a test piece having a shape in accordance with GOST standards for a steel plate.

The content ratio of MA in a metallographic structure is 3% or more and 15% or less in terms of area fraction of MA (calculated as the average value of the area ratios of MA in arbitrary cross sections in the rolling direction, the width direction and the like of a steel plate). When the area fraction of MA is less than 3%, there is an insufficient decrease in yield ratio. When the area fraction of MA is more than 15%, there is a decrease in the toughness of a base metal.

In addition, it is preferable that the area fraction of MA be 5% or more and 12% or less from the viewpoint of decreasing yield ratio and increasing uniform elongation and base-material toughness. More preferably, the area fraction of MA is 5% or more and 10% or less. Incidentally, the area fraction of MA means the ratio with respect to the whole microstructure of steel.

MA can be easily identified by observing a sample prepared by etching a steel plate using, for example, a 3% nital solution (nital: nitric acid alcohol solution) and by subsequently performing electrolytic etching. By observing the microstructure of a steel plate using a scanning electron microscope (SEM), MA is recognized as a distinct white portion.

The area fraction of MA can be calculated, for example, as the average value of the area ratios of MA by performing image processing on microstructure photographs of at least 4 microscopic fields taken through observation using a scanning electron microscope (SEM).

In addition, the equivalent circle diameter of MA is set to be 3.0 μm or less from the viewpoint of achieving sufficient toughness for a base metal and increasing uniform elongation. This is because, when the equivalent circle diameter of MA is more than 3.0 μm, there is a decrease in the toughness of a base metal.

The equivalent circle diameter of MA can be calculated as the average value of the diameters of the circles respectively having the same areas as MA grains obtained by performing image processing on microstructure taken through observation using a SEM.

Mn and Si are added to form MA without adding large amounts of expensive alloying chemical elements such as Cu, Ni, and Mo. It is important to stabilize a non-transformed austenite phase with this method to suppress pearlite transformation or formation of a cementite phase during reheating and when air-cooling is performed after reheating has been performed.

The mechanism to form MA and soften a bainite phase in the surface portions will be roughly described hereafter. Manufacturing conditions will be described in detail later.

After having heated a slab, rolling is finished in a temperature range to form an austenite phase, and then accelerated cooling is started at a temperature equal to or higher than the $Ar_3$ transformation point from the viewpoint of suppressing formation of a ferrite phase.

In a manufacturing process, in which, after accelerated cooling has been finished in the middle of a bainite transformation process, that is, in a temperature range in which a non-transformed austenite phase is present, reheating is started at a temperature higher than a temperature (Bf point) at which bainite transformation is finished, and then cooling is performed, changes in a microstructure will be described hereafter.

When accelerated cooling is finished, the microstructure consists of a bainite phase and a non-transformed austenite phase. After that, by performing reheating starting at a temperature higher than the Bf point, transformation from a non-transformed austenite phase to a bainite phase occurs. Since the solid solubility limit of C in a bainite phase is small, C is evacuated into the surrounding non-transformed austenite phase. Therefore, the C content in a non-transformed austenite phase increases as bainite transformation progresses when reheating is performed. At this time, when austenite stabilizing chemical elements such as Cu and Ni are contained in certain amounts or more, a non-transformed austenite phase in which C is concentrated are retained even after reheating has been finished and transforms into MA when cooling is performed after reheating has been performed, and finally, a microstructure in which MA is formed in a bainite structure is formed.

It is important to start reheating in a temperature range in which a non-transformed austenite phase is present after accelerated cooling has been performed. When the reheating-start temperature is equal to or lower than the Bf point, bainite transformation is completed, and a non-transformed austenite phase is not present. Therefore, it is necessary that the reheating-start temperature be higher than the Bf point.

In addition, there is no particular limitation on cooling after reheating has been performed because it has no influence on MA transformation. However, it is basically preferable that air-cooling be used. By using steel containing a certain amount of Mn, by stopping accelerated cooling in the middle of a bainite transforming process and by subsequently starting reheating immediately after the accelerated cooling has been stopped, hard MA can be formed without decreasing productivity.

Incidentally, although the steel has a metallographic structure in which a certain amount of MA is uniformly included in a bainite phase, steel plates having other types of microstructures and precipitates as long as the desired effects are not decreased.

Specifically, when one, two or more of other phases such as a pearlite phase and a cementite phase are mixed in addition, there is a decrease in strength. However, when the area fractions of the microstructures other than a bainite phase and MA is small, the effect on decrease in strength is negligible. Therefore, as long as the total area fraction of a metallographic structures other than a bainite phase and MA, that is, a pearlite phase, a cementite phase and the like is 3% or less with respect to the whole microstructure, one or more of these metallographic structures may be included.

The metallographic structure described above can be formed using steel having the chemical composition described above and the manufacturing methods described hereafter.

3. Regarding Manufacturing Conditions

It is preferable that steel having the chemical composition described above be produced with a common method using melting and refining means such as a converter or an electric furnace and be made into a steel material such as a slab using a common method such as a continuous casting method or an ingot casting-slabbing method. A melting and refining method and a casting method are not limited to those described above. The steel material is then rolled into a desired shape, and cooling and heating are performed after rolling has been performed.

A cooling start temperature and a reheating temperature are expressed in terms of the surface temperature of a steel plate, and a cooling rate and a cooling stop temperature are expressed in terms of both the surface temperature of a steel plate and the average temperature of a steel plate, unless otherwise noted. Other temperatures such as a slab heating temperature, a controlled rolling start temperature, and a controlled rolling finish temperature are expressed in terms of the average temperature of a steel plate.

The average temperature of a steel plate is calculated from the surface temperature of a slab or a steel plate in consideration of parameters such as thickness and thermal conductivity. In addition, a cooling rate is an average cooling rate which is derived by dividing a temperature difference necessary for cooling from a temperature after hot rolling has been finished down to a cooling stop temperature (450° C. to 650° C.) by a time spent for the cooling.

In addition, a heating rate is an average heating rate derived by dividing a temperature difference necessary for reheating from a temperature after cooling has been finished up to a reheating temperature (550° C. to 750° C.) by a time spent for the reheating. Manufacturing conditions will be described in detail hereafter.

As the $Ar_3$ transformation temperature, the value which is derived using the following equation will be used:

$$Ar_3(°\ C.)=910-310C-80Mn-20Cu-15Cr-55Ni-80Mo,$$

where an atomic symbol represents the mass % of the chemical element represented by the symbol.

Heating temperature: 1000° C. or higher and 1300° C. or lower

When the heating temperature is lower than 1000° C., a sufficient solution of carbides cannot occur, and the desired strength cannot be achieved. When the heating temperature is higher than 1300° C., there is a decrease in the toughness of a base metal. Therefore, the heating temperature is 1000° C. or higher and 1300° C. or lower.

Rolling finish temperature: equal to or higher than the $Ar_3$ transformation temperature When the rolling finish temperature is lower than the $Ar_3$ transformation temperature, there is a decrease in ferrite transformation rate after rolling has been finished, and there is insufficient concentration of C into a non-transformed austenite phase when reheating is performed, which results in MA not being formed. Therefore, the rolling finish temperature is equal to or higher than the $Ar_3$ transformation temperature.

Cumulative rolling reduction ratio in a temperature range of 900° C. or lower: 50% or more This condition is one of the important manufacturing conditions. A temperature range of 900° C. or lower corresponds to the lower part of no-recrystallization temperature range in austenite. By controlling the cumulative rolling reduction ratio to be 50% or more in this temperature range, a decrease in austenite grain size can be achieved. With this method, there is an increase in the number of forming sites of MA to be formed at prior-austenite grain boundaries afterward, which contributes to the suppression of an increase in MA grain size.

When the cumulative rolling reduction ratio in a temperature range of 900° C. or lower is less than 50%, since the equivalent circle diameter of formed MA becomes more than 3.0 µm, there is a decrease in uniform elongation and/or there is a decrease in the toughness of a base metal. Therefore, the cumulative rolling reduction ratio in a temperature range of 900° C. or lower is 50% or more.

FIG. 1 is a schematic diagram illustrating a cooling curve expressed in terms of the average temperature of a steel plate and a cooling-heating curve expressed in terms of the surface temperature of a steel plate in an accelerated cooling process.

A cooling start temperature is equal to or higher than the $Ar_3$ transformation temperature in terms of the surface temperature of a steel plate.

After rolling has been finished, accelerated cooling is started at a temperature equal to or higher than the $Ar_3$ transformation temperature. When the cooling start temperature is lower than the $Ar_3$ transformation temperature, a polygonal ferrite phase is formed, which results in a decrease in strength. Therefore, the cooling start temperature is equal to or higher than the $Ar_3$ transformation temperature.

Regarding the cooling of the steel plate, the cooling rate is 150° C./sec. or less and the cooling stop temperature is 600° C. or lower in terms of the surface temperature of the steel plate.

By performing cooling under conditions such that the cooling rate is 150° C./sec. or less and the cooling stop temperature is 600° C. or lower in terms of the surface temperature of the steel plate, a bainite structure in the surface portions of the steel plate becomes soft. With this method, the maximum hardness of the surface portions of the steel plate can be controlled to be HV230 or less in terms of Vickers hardness, and hardness variations in the thickness direction and in the width direction can be suppressed to be ΔHV30 or less. By controlling hardness variations in the thickness and width directions to be ΔHV30 or less and by controlling the maximum hardness of the surface portions to be HV230 or less as described above, the elongation variation and a decrease in elongation of the steel plate can be suppressed. Thus, an elongation of 22% or more can be stably achieved. In addition, the reason why the yield ratio of a steel plate is 85% or less and the elongation of the steel plate is 22% or more will be described hereafter. This is because it is necessary that the target value of the yield ratio be 85% or less and the target value of the elongation be 22% or more at the stage of the steel plate to achieve a yield ratio of 90% or less and an elongation of 20% or more at the stage of a steel pipe in consideration of changes in properties of the materials due to the working strain induced by forming a steel plate to a steel pipe.

The cooling stop temperature is 600° C. or lower in terms of the surface temperature of the steel plate to control the surface temperature of the steel plate to be lower than or equal to a temperature at which bainite transformation starts, and it is preferable that the cooling stop temperature be 200° C. or higher and 500° C. or lower in terms of the surface temperature of the steel plate. Incidentally, since the upper limit of a cooling rate has an influence on the hardness of the surface of a steel plate, and since a polygonal ferrite phase is not formed to soften the surface portion of a steel plate, the upper limit of the cooling rate is 150° C./sec.

A cooling rate in terms of the average temperature of the steel plate is 15° C./sec. or more.

When the cooling rate is less than 15° C./sec., a pearlite phase is formed when cooling is performed, and sufficient strength or sufficiently low yield ratio cannot be achieved. Therefore, the cooling rate in terms of the average temperature of the steel plate is 15° C./sec. or more.

The steel plate is supercooled down to a temperature range for bainite transformation by performing accelerated cooling, and it is possible to complete bainite transformation when reheating is subsequently performed without holding the steel plate at the reheating temperature.

A cooling stop temperature in terms of the average temperature of the steel plate is 450° C. or higher and 650° C. or lower.

This process is an important manufacturing condition. A non-transformed austenite phase present after reheating has been performed and in which C is concentrated, transforms into MA when air-cooling is performed after reheating has been performed.

That is, it is necessary that cooling be stopped in the middle of bainite transformation, that is, in a temperature range in which a non-transformed austenite phase is present. When the cooling stop temperature is lower than 450° C., bainite transformation is completed, and MA is not formed when air-cooling is performed and a decrease in yield ratio cannot be achieved. When the cooling stop temperature is higher than 650° C., C is consumed by a pearlite phase which is precipitated when cooling is performed, and MA is not formed. Therefore, the accelerated cooling stop temperature is 450° C. or higher and 650° C. or lower. The accelerated cooling stop temperature preferably be 500° C. or higher and 600° C. or lower from the viewpoint of achieving the area fraction of MA which is ideal for achieving better strength and toughness. Regarding this accelerated cooling, an arbitrary cooling apparatus can be used.

Immediately after accelerated cooling has been stopped, reheating is performed up to a temperature of 550° C. or higher and 750° C. or lower at a heating rate of 1.0° C./sec. or more in terms of the surface temperature of the steel plate.

"Reheating is performed immediately after accelerated cooling has been stopped" means that reheating is performed at a heating rate of 1.0° C./sec. or more within 120 seconds after accelerated cooling has been stopped.

This process is also an important manufacturing condition. While a non-transformed austenite phase transforms into a bainite phase when reheating is performed after accelerated cooling has been performed as described above, C is evacuated into a non-transformed austenite phase which is remaining. Then, the non-transformed austenite phase in which C is concentrated is transformed into MA when air-cooling is performed after reheating has been performed.

To form MA, it is necessary that reheating be performed from a temperature higher than the Bf point to a temperature of 550° C. or higher and 750° C. or lower after accelerated cooling has been performed.

When the heating rate is less than 1.0° C./sec., it takes a long time for a steel plate to reach the target reheating temperature, which results in a decrease in productivity and, there is an increase in MA grain size. As a result, it is impossible to achieve a sufficiently low yield ratio, sufficient toughness or sufficient uniform elongation. Although the mechanisms are not necessarily clear, the reason is thought to be as follows. That is, by increasing the heating rate for reheating to be 1.0° C./sec. or more, an increase in size of a region in which C is concentrated is suppressed, and an increase in grain size of MA which is formed in a cooling process after reheating has been performed is suppressed.

When the reheating temperature is lower than 550° C., transformation does not sufficiently progress, and a sufficient amount of C is not evacuated into a non-transformed austenite phase and a decrease in yield ratio cannot be achieved as a result of a sufficient amount of MA not being formed. When the reheating temperature is higher than 750° C., sufficient strength cannot be achieved due to the softening of a bainite phase. Therefore, the reheating temperature is 550° C. or higher and 750° C. or lower.

After accelerated cooling has been performed, it is important to start reheating in a temperature range in which a non-transformed austenite phase is present. In this reheating process, when a reheating start temperature is equal to or lower than the Bf point, bainite transformation is completed, and a non-transformed austenite phase disappears. Therefore, it is necessary that the reheating start temperature be higher than the Bf point.

It is preferable that a steel plate be heated up to a temperature 50° C. or more higher than the reheating start temperature to ensure that C is concentrated in a non-transformed austenite phase. It is not particularly necessary that a holding time be set during which the steel plate is held at the reheating temperature.

By using the manufacturing method, even when cooling is performed immediately after reheating has been performed, a sufficient amount of MA is achieved, and thus a decrease in yield ratio and an increase in uniform elongation are achieved. However, to ensure that sufficient volume fraction of MA is achieved by promoting the diffusion of C more into a non-transformed austenite phase more, the steel plate may be held at the reheating temperature for 30 minutes or less.

When the temperature holding time is more than 30 minutes, there is a decrease in strength due to the occurrence of recovery of a bainite phase. In addition, it is preferable to perform cooling fundamentally using an air-cooling method after reheating has been performed.

As an apparatus that performs reheating after accelerated cooling has been performed, a heating apparatus may be equipped downstream of a cooling apparatus for performing accelerated cooling. Among heating apparatuses, it is preferable to use a gas-fired furnace or an induction heating apparatus with which a steel plate can be heated at a high heating rate.

As described above, first, rolling is performed under conditions such that the cumulative rolling reduction ratio is 50% or more in a temperature range of 900° C. or lower which is a no-recrystallization temperature range in austenite. With this method, there is an increase in the number of MA formation sites as a result of a decrease in an austenite grain size, and fine MA can be uniformly dispersed, which results in a low yield ratio of 85% or less in the state of a steel plate and of 90% or less in the state of a steel pipe being achieved.

Moreover, by performing reheating at a high heating rate after accelerated cooling has been performed, an increase in an MA grain size is suppressed so that the equivalent circle diameter of MA is decreased to 3.0 μm or less. In addition, by performing cooling at a cooling rate of 150° C./sec. or less in terms of the surface temperature of a steel plate down to a temperature of 600° C. or lower in terms of the surface temperature of a steel plate, a bainite phase in the surface portion of the steel plate can be softened, which results in an elongation of 22% or more in the state of a steel plate and of 20% or more in the state of a steel pipe being achieved in a full-thickness tensile test using a test piece having a shape in accordance with GOST standards.

With this method, even if a thermal history which causes deterioration of properties due to strain ageing in the case of a conventional steel is applied, MA is less likely to decompose in the case of the steel and, therefore, it is possible to maintain the specified metallographic structure consisting of a duplex-phase structure of a bainite phase and MA.

As a result, even if a thermal history is applied at a temperature of 250° C. for 30 minutes, which is classified into a thermal history at a high temperature and for a long duration among common coating processes for steel pipes, an increase in yield stress (YS) caused by strain aging and accompanied by an increase in yield ratio and a decrease in uniform elongation can be suppressed. That is, the specified properties in the state of a steel plate and in the state of a steel pipe can be assured in the steel even if a thermal history which causes deterioration of properties due to strain ageing in a conventional steel plate is applied.

Incidentally, when a steel pipe is manufactured using our steel plate, the steel plate is formed into a cylindrical shape and the butted portions thereof are welded under conditions such that single-layer welding is performed on each of the outer and inner surfaces. Then, by performing a pipe-expanding treatment under a condition of a pipe expanding ratio of 0.4% or more and 2.0% or less, a steel pipe having good roundness can be obtained.

Examples 1

The steels (steel types A through J) having the chemical compositions given in Table 1 were cast into slabs using a continuous casting method, and thick steel plates (Nos. 1 through 17) having a thickness of 20 mm, 28 mm or 33 mm were manufactured.

TABLE 1

| Steel Type | Chemical Composition (mass %) | | | | | | | | | | | |
|---|---|---|---|---|---|---|---|---|---|---|---|---|
| | C | Si | Mn | P | S | Al | Nb | Ti | Cu | Ni | Cr | Mo |
| A | 0.032 | 0.20 | 2.5 | 0.008 | 0.001 | 0.03 | 0.034 | 0.014 | — | — | — | — |
| B | 0.051 | 0.56 | 1.8 | 0.008 | 0.002 | 0.04 | 0.023 | 0.011 | 0.24 | 0.20 | — | — |
| C | 0.072 | 0.06 | 1.8 | 0.011 | 0.001 | 0.03 | 0.044 | 0.013 | — | — | — | 0.22 |

TABLE 1-continued

| | | | | | | | | | | | | |
|---|---|---|---|---|---|---|---|---|---|---|---|---|
| D | 0.064 | 0.15 | 1.7 | 0.008 | 0.001 | 0.03 | 0.021 | 0.009 | 0.20 | 0.20 | — | 0.18 |
| E | 0.054 | 0.15 | 2.2 | 0.008 | 0.001 | 0.04 | 0.025 | 0.008 | — | — | 0.10 | — |
| F | 0.058 | 0.16 | 1.7 | 0.009 | 0.001 | 0.03 | 0.009 | 0.016 | 0.16 | 0.18 | 0.03 | 0.20 |
| G | 0.063 | 0.13 | 1.9 | 0.008 | 0.001 | 0.03 | 0.014 | 0.013 | — | — | — | 0.20 |
| H | 0.023 | 0.38 | 2.4 | 0.008 | 0.002 | 0.03 | 0.032 | 0.010 | — | — | — | — |
| I | 0.062 | 0.65 | 1.1 | 0.009 | 0.001 | 0.03 | 0.024 | 0.011 | — | — | — | 0.10 |
| J | 0.071 | 0.34 | 2.2 | 0.008 | 0.001 | 0.03 | 0.035 | 0.014 | — | — | — | — |

| Steel Type | Chemical Composition (mass %) | | | | | $Ar_3$ Transformation Point (° C.) | Ti/N | Note |
|---|---|---|---|---|---|---|---|---|
| | V | Ca | B | N | O | | | |
| A | — | — | — | 0.004 | 0.002 | 700 | 3.5 | Example |
| B | — | — | — | 0.005 | 0.001 | 734 | 2.2 | Example |
| C | — | — | — | 0.004 | 0.001 | 726 | 3.3 | Example |
| D | — | 0.0018 | — | 0.005 | 0.002 | 725 | 1.8 | Example |
| E | — | — | — | 0.005 | 0.002 | 716 | 1.6 | Example |
| F | 0.030 | 0.0016 | — | 0.006 | 0.002 | 725 | 2.7 | Example |
| G | — | — | 0.0010 | 0.004 | 0.002 | 722 | 3.3 | Example |
| H | — | — | — | 0.005 | 0.001 | 711 | 2.0 | Comparative Example |
| I | — | — | 0.0008 | 0.004 | 0.002 | 795 | 2.8 | Comparative Example |
| J | — | — | — | 0.004 | 0.002 | 734 | 3.5 | Comparative Example |

Annotation: Underlined value is out of the range.
Annotation: $Ar_3$ Transformation Point (° C.) = 910 − 310C − 80Mn − 20Cu − 15Cr − 55Ni − 80Mo (An atomic symbol represents the content (mass %) of the chemical element represented by the symbol.)

Immediately after hot-rolling had been performed on the heated slabs, cooling was performed using a water-cooling type accelerated cooling apparatus, and then reheating was performed using an induction heating furnace or a gas-fired furnace. The induction heating furnace or a gas-fired furnace was equipped on the same line as an accelerated cooling apparatus.

The manufacturing conditions of the steel plates (Nos. 1 through 17) are given in Table 2. Incidentally, temperature such as a heating temperature, a rolling finish temperature, a cooling stop (finish) temperature, and a reheating temperature were represented in terms of the average temperature of the steel plate. The average temperature was calculated from the surface temperature of the slab or the steel plate using parameters such as thickness and thermal conductivity.

In addition, a cooling rate is an average cooling rate which was derived by dividing a temperature difference necessary for cooling from a temperature after hot rolling has been finished down to a cooling stop (finish) temperature (450° C. to 650° C.) by a time spent for the cooling. In addition, reheating rate (heating rate) is an average heating rate which was derived by dividing a temperature difference necessary for a reheating from a temperature after cooling had been finished up to a reheating temperature (550° C. to 750° C.) by a time spent for the reheating.

TABLE 2

| No. | Steel Type | Thickness (mm) | Heating Temperature (° C.) | Cumulative Rolling Reduction at 900° C. or under (%) | Rolling Finish Temperature (° C.) | Cooling in Terms of Surface Temperature*1 | | |
|---|---|---|---|---|---|---|---|---|
| | | | | | | Cooling Start Temperature of Steel Plate Surface (° C.) | Cooling Rate of Steel Plate Surface (° C./sec.) | Cooling Stop Temperature of Steel Plate Surface Before Recuperation (° C.) |
| 1 | A | 20 | 1130 | 65 | 780 | 720 | 130 | 390 |
| 2 | B | 20 | 1120 | 60 | 800 | 740 | 135 | 430 |
| 3 | C | 33 | 1080 | 70 | 780 | 730 | 120 | 410 |
| 4 | D | 20 | 1180 | 70 | 790 | 740 | 140 | 420 |
| 5 | E | 28 | 1050 | 60 | 790 | 730 | 135 | 340 |
| 6 | F | 33 | 1150 | 55 | 800 | 740 | 130 | 400 |
| 7 | G | 28 | 1150 | 75 | 780 | 730 | 135 | 370 |
| 8 | E | 20 | 970 | 75 | 790 | 730 | 135 | 410 |
| 9 | E | 20 | 1150 | 40 | 790 | 730 | 140 | 380 |
| 10 | E | 20 | 1180 | 75 | 790 | 730 | 130 | 400 |
| 11 | F | 28 | 1100 | 65 | 800 | 740 | 135 | 260 |
| 12 | F | 28 | 1200 | 60 | 800 | 740 | 135 | 410 |
| 13 | F | 28 | 1080 | 70 | 800 | 740 | 140 | 350 |
| 14 | F | 28 | 1080 | 70 | 760 | 720 | 230 | 200 |
| 15 | H | 20 | 1150 | 75 | 790 | 730 | 140 | 420 |

TABLE 2-continued

| 16 | I | 20 | 1090 | 70 | 840 | 800 | 140 | 310 |
|---|---|---|---|---|---|---|---|---|
| 17 | J | 28 | 1180 | 75 | 800 | 750 | 135 | 380 |

| | Cooling in Terms of Average Temperature*2 | | | | | |
|---|---|---|---|---|---|---|
| No. | Average Cooling Rate of Steel Plate (°C./sec.) | Average Cooling Stop Temperature of Steel Plate (°C.) | Reheating Apparatus | Reheating Rate (°C./sec.) | Reheating Temperature (°C.) | Note |
| 1 | 30 | 590 | Induction Heating Furnace | 2 | 650 | Example |
| 2 | 35 | 630 | Induction Heating Furnace | 3 | 650 | Example |
| 3 | 20 | 610 | Induction Heating Furnace | 3 | 680 | Example |
| 4 | 40 | 620 | Induction Heating Furnace | 5 | 650 | Example |
| 5 | 35 | 540 | Gas-fired Furnace | 2 | 680 | Example |
| 6 | 30 | 600 | Induction Heating Furnace | 3 | 660 | Example |
| 7 | 35 | 570 | Induction Heating Furnace | 5 | 650 | Example |
| 8 | 35 | 610 | Induction Heating Furnace | 7 | 680 | Comparative Example |
| 9 | 40 | 580 | Induction Heating Furnace | 5 | 650 | Comparative Example |
| 10 | <u>3</u> | 600 | Induction Heating Furnace | 6 | 680 | Comparative Example |
| 11 | 35 | <u>430</u> | Induction Heating Furnace | 5 | 650 | Comparative Example |
| 12 | 35 | 610 | Induction Heating Furnace | <u>0.2</u> | 680 | Comparative Example |
| 13 | 40 | 550 | Induction Heating Furnace | 7 | <u>530</u> | Comparative Example |
| 14 | 40 | 550 | Induction Heating Furnace | 7 | 650 | Comparative Example |
| 15 | 40 | 620 | Induction Heating Furnace | 6 | 650 | Comparative Example |
| 16 | 40 | 510 | Induction Heating Furnace | 7 | 680 | Comparative Example |
| 17 | 35 | 580 | Induction Heating Furnace | 2 | 650 | Comparative Example |

Annotation: Underlined value is out of the range.
*1Cooling is controlled on the basis of a surface temperature of a steel plate.
*2Cooling is controlled on the basis of an average temperature of a steel plate.

The mechanical properties of the steel plates manufactured as described above were determined. The results are given in Table 3. Tensile strength was evaluated on the basis of the average value thereof derived by collecting 2 test pieces for a full-thickness tensile test in a direction (C direction) at a right angle to the rolling direction and by performing a tensile test. The required strength is a tensile strength of 590 MPa or more (API 5L×60 or more). A yield ratio and an elongation were evaluated on the basis of the average value thereof derived by collecting 2 test pieces for a full-thickness tensile test in a direction at a right angle to the rolling direction and by performing a tensile test. The required deformation performances are a yield ratio of 85% or less and an elongation of 22% or more.

The toughness of a base metal was evaluated, by collecting 3 full-size V notch Charpy test pieces in a direction at a right angle to the rolling direction, by performing a Charpy test, by determining absorbed energy at a temperature of −40° C. and by calculating the average value of the 3 values. When the absorbed energy at a temperature of −40° C. was 200 J or more was evaluated as good.

Regarding toughness in a weld heat affected zone (HAZ), 3 test pieces that had been subjected to a thermal history corresponding to a heat input of 40 kJ/cm using a reproducing apparatus of weld thermal cycles were collected, and a Charpy impact test was performed for those test pieces. Then, absorbed energy at a temperature of −40° C. was determined, and the average value for the 3 test pieces was calculated. A case where the Charpy absorbed energy at a temperature of −40° C. was 100 J or more was evaluated as good.

yield ratio or the elongation was insufficient or the sufficient strength or toughness was not obtained in condition of before a strain ageing treatment at a temperature of 250° C. for 30 minutes. In Nos. 15 through 17, since the chemical compositions were out of our range, the yield ratio and elongation of No. 15 were out of our range, and the tensile strength, elongation, and yield ratio of No. 16 were all out of our range. The toughness in a weld heat affected zone (HAZ) of No. 17 was out of our range.

Subsequently, UOE steel pipes were manufactured using the steel plates (Nos. 1 through 17) that had been manufactured under conditions given in Table 2.

TABLE 3

| No. | Steel Type | Thickness (mm) | MA Fraction in Steel Plate (%) | MA Equivalent Circle Diameter in Steel Plate (mm) | C Direction in Plate State (Before Aging Treatment of 250° C.'30 min.) | | | | | | | | |
|---|---|---|---|---|---|---|---|---|---|---|---|---|---|
| | | | | | Tensile Strength (MPa) | Yield Ratio (%) | Uniform Elongation (%) | Total Elongation (%) | Hardness Variation in Thickness Direction DHV | Hardness Variation in Width Direction DHV | Surface Hardness HV | Base Metal Toughness vE-40° C. (J) | HAZ Toughness vE-40° C. (J) | Note |
| 1 | A | 20 | 11 | 1.6 | 621 | 75 | 12 | 24 | 20 | 25 | 222 | 307 | 141 | Example |
| 2 | B | 20 | 8 | 1.2 | 610 | 74 | 12 | 25 | 15 | 18 | 203 | 312 | 124 | Example |
| 3 | C | 33 | 13 | 2.6 | 677 | 71 | 11 | 23 | 24 | 23 | 214 | 294 | 118 | Example |
| 4 | D | 20 | 7 | 1.7 | 622 | 75 | 13 | 25 | 22 | 19 | 211 | 274 | 164 | Example |
| 5 | E | 28 | 6 | 1.6 | 655 | 73 | 11 | 26 | 14 | 16 | 220 | 318 | 155 | Example |
| 6 | F | 33 | 10 | 1.3 | 662 | 78 | 13 | 24 | 18 | 13 | 217 | 333 | 131 | Example |
| 7 | G | 28 | 4 | 1.5 | 636 | 70 | 12 | 25 | 11 | 14 | 216 | 361 | 182 | Example |
| 8 | E | 20 | <u>1</u> | 2.5 | <u>556</u> | <u>89</u> | <u>9</u> | 26 | 22 | 23 | 210 | 335 | 178 | Comparative Example |
| 9 | E | 20 | 7 | <u>3.5</u> | 608 | 77 | 12 | 27 | 25 | 24 | 222 | <u>129</u> | 124 | Comparative Example |
| 10 | E | 20 | <u>2</u> | 2.4 | 620 | <u>87</u> | 11 | 24 | 23 | 22 | 211 | 273 | 138 | Comparative Example |
| 11 | F | 28 | <u>0</u> | 1.5 | 655 | <u>94</u> | <u>9</u> | <u>21</u> | 26 | <u>34</u> | <u>232</u> | 285 | 161 | Comparative Example |
| 12 | F | 28 | <u>1</u> | 1.6 | 660 | 83 | <u>8</u> | <u>20</u> | 23 | 16 | 224 | 288 | 144 | Comparative Example |
| 13 | F | 28 | <u>0</u> | 1.3 | 633 | <u>89</u> | <u>9</u> | <u>20</u> | 25 | 25 | 215 | 312 | 116 | Comparative Example |
| 14 | F | 28 | 4 | 1.8 | 645 | 84 | 12 | <u>21</u> | <u>35</u> | <u>32</u> | <u>235</u> | 277 | 136 | Comparative Example |
| 15 | <u>H</u> | 20 | <u>1</u> | 1.4 | 655 | <u>88</u> | <u>8</u> | 25 | 16 | 18 | 207 | 293 | 122 | Comparative Example |
| 16 | <u>I</u> | 20 | <u>0</u> | 1.8 | <u>581</u> | <u>86</u> | <u>9</u> | <u>21</u> | 22 | 27 | 227 | 281 | 133 | Comparative Example |
| 17 | <u>J</u> | 28 | 14 | <u>4.3</u> | 643 | 66 | 12 | <u>21</u> | <u>34</u> | <u>33</u> | <u>233</u> | 302 | <u>28</u> | Comparative Example |

Annotation: Underlined value is out of the range.
Annotation: Tensile test was performed according to GOST (long gauge length).

In Table 3, in all of our Examples Nos. 1 through 7, the chemical compositions and the manufacturing conditions were in our range and each of these examples had a high strength of 590 MPa or more in terms of tensile strength, a low yield ratio of 85% or less, a high elongation of 22% or more and good toughness for a base metal and a weld heat affected zone.

In addition, the microstructure in the central portion of the steel plate included mainly a bainite phase in which MA is dispersed, in which the area fraction of MA was 3% or more and 15% or less, and in which the equivalent circle diameter of MA was 3.0 μm or less. The area fraction of MA was determined by performing image processing on a microstructure observed using a scanning electron microscope (SEM).

On the other hand, in the Comparative Examples Nos. 8 through 14, the chemical compositions were in our range, but the manufacturing methods were out of our range. As a result, the microstructures were out of our range, and the After the obtained steel plates were formed by performing U-press and O-press, using a submerged arc welding method, inner surface seam welding was performed, and then outer surface seam welding was performed. Subsequently, by performing pipe-expanding treatment under a condition of a pipe-expanding ratio of 0.6% to 1.2%, steel pipes having an outer diameter of 400 to 1626 mm were manufactured. Using a tensile test piece in accordance with GOST standards cut out of the base metal of the steel pipe, tensile properties were evaluated. In addition, using a tensile test piece in accordance with GOST standards cut out of a sample material by the same method described above, which had been cut out of the base metal of the pipe to form the test pieces and subjected to an ageing treatment at a temperature of 250° C. for 30 minutes, tensile properties after having undergone ageing treatment were evaluated. In addition, using a V-notch Charpy impact test piece according to JIS Z 2202 (1980) cut out of the central portion in the thickness direction of the base metal of the steel pipe, a Charpy impact test was performed at a test temperature of −40° C. Moreover, using a test piece for a DWTT (Drop Weight Tear Test) according to API-5L cut out of the steel pipe, a DWTT was performed at a test temperature of −20° C. to determine an SA value (Shear Area: ductile fracture area ratio). In addition, using a V-notch Charpy impact test piece according to JIS Z 2202 (1980) cut out of the portion of the outer surface FL (Fusion Line) of the welded joint of the steel pipe, a Charpy impact test was performed at a test temperature of −40° C. The notch was formed at a position where the HAZ and the weld metal were included at a ratio of 1:1.

The test results are given in Table 4.

before and after an ageing treatment at a temperature of 250° C. for 30 minutes. At the same time, the target ranges regarding the base metal are a Charpy absorbed energy at a test temperature of −40° C. of 200 J or more and a DWTTSA-20° C. (ductile fracture area ratio in a DWTT test at a test temperature of −20° C.) of 85% or more, and the target range regarding the seam weld joint of steel pipe is a Charpy absorbed energy of 100 J or more at an outer surface FL notch at a test temperature of −40° C.

In Table 4, in all cases of our Examples Nos. 1 through 7, the chemical compositions and the manufacturing methods were in our ranges. Therefore, before and after a strain

TABLE 4

| | | | MA Equivalent | | C Direction in UOE Pipe State (Before Aging Treatment of 250° C.' 30 min.) | | | | | | | |
|---|---|---|---|---|---|---|---|---|---|---|---|---|
| | | | MA Fraction | Circle Diameter | | | | | | | Base Metal Toughness | | HAZ |
| No. | Steel Type | Thickness (mm) | in Steel Plate (%) | in Steel Plate (mm) | Yield Strength (MPa) | Tensile Strength (MPa) | Yield Ratio (%) | Uniform Elongation (%) | Total Elongation (%) | vE-40° C. (J) | DWTT SA-20° C. (%) | Toughness vE-40° C. (J) |
| 1 | A | 20 | 11 | 1.6 | 532 | 626 | 85 | 10 | 22 | 307 | 100 | 141 |
| 2 | B | 20 | 8 | 1.2 | 517 | 616 | 84 | 10 | 23 | 312 | 100 | 124 |
| 3 | C | 33 | 13 | 2.6 | 547 | 675 | 81 | 9 | 21 | 294 | 100 | 118 |
| 4 | D | 20 | 7 | 1.7 | 534 | 628 | 85 | 11 | 23 | 274 | 100 | 164 |
| 5 | E | 28 | 6 | 1.6 | 547 | 659 | 83 | 9 | 24 | 318 | 100 | 155 |
| 6 | F | 33 | 10 | 1.3 | 559 | 665 | 84 | 12 | 22 | 333 | 100 | 131 |
| 7 | G | 28 | 4 | 1.5 | 514 | 642 | 80 | 10 | 23 | 361 | 100 | 182 |
| 8 | E | 20 | <u>1</u> | 2.5 | 514 | <u>559</u> | <u>92</u> | <u>7</u> | 24 | 335 | 100 | 178 |
| 9 | E | 20 | 7 | <u>3.5</u> | 509 | 613 | 83 | 10 | 25 | <u>129</u> | <u>75</u> | 124 |
| 10 | E | 20 | <u>2</u> | 2.4 | 571 | 628 | <u>91</u> | 9 | 22 | 273 | 100 | 138 |
| 11 | F | 28 | <u>0</u> | 1.5 | 617 | 663 | <u>93</u> | <u>7</u> | <u>19</u> | 285 | 100 | 161 |
| 12 | F | 28 | <u>1</u> | 1.6 | 559 | 666 | 84 | <u>6</u> | <u>18</u> | 288 | 100 | 144 |
| 13 | F | 28 | <u>0</u> | 1.3 | 581 | 639 | <u>91</u> | <u>7</u> | <u>18</u> | 312 | 100 | 116 |
| 14 | F | 28 | 4 | 1.8 | 554 | 652 | 85 | 11 | <u>19</u> | 277 | 100 | 136 |
| 15 | <u>H</u> | 20 | <u>1</u> | 1.4 | 599 | 661 | <u>91</u> | <u>6</u> | 23 | 293 | 100 | 122 |
| 16 | <u>I</u> | 20 | <u>0</u> | 1.8 | 534 | <u>580</u> | <u>92</u> | <u>7</u> | <u>19</u> | 281 | 95 | 133 |
| 17 | <u>J</u> | 28 | 14 | <u>4.3</u> | 518 | 648 | 80 | 10 | <u>19</u> | 302 | 100 | <u>28</u> |

| | C Direction in Ageing Treated Pipe State (After Aging Treatment of 250° C.' 30 min.) | | | | | | | L Direction in Ageing Treated Pipe State (After Aging Treatment of 250° C.' 30 min.) | | | | | |
|---|---|---|---|---|---|---|---|---|---|---|---|---|---|
| | | | | Uniform Elonga- | Total Elonga- | Base Metal Toughness | | HAZ | | | | | |
| | Yield Strength | Tensile Strength | Yield Ratio | tion | tion | vE-40° C. | DWTT SA-20° C. | Toughness vE-40° C. | Yield Strength | Tensile Strength | Yield Ratio | Uniform Elongation | Total Elongation | |
| No. | (MPa) | (MPa) | (%) | (%) | (%) | (J) | (%) | (J) | (MPa) | (MPa) | (%) | (%) | (%) | Note |
| 1 | 544 | 632 | 86 | 9 | 22 | 321 | 100 | 132 | 542 | 630 | 86 | 10 | 22 | Example |
| 2 | 531 | 625 | 85 | 10 | 22 | 304 | 100 | 133 | 530 | 623 | 85 | 11 | 21 | |
| 3 | 575 | 684 | 84 | 10 | 21 | 288 | 100 | 122 | 571 | 680 | 84 | 10 | 22 | |
| 4 | 532 | 633 | 84 | 11 | 23 | 268 | 100 | 141 | 529 | 630 | 84 | 10 | 23 | |
| 5 | 557 | 671 | 83 | 9 | 23 | 307 | 100 | 146 | 549 | 661 | 83 | 9 | 24 | |
| 6 | 584 | 679 | 86 | 10 | 21 | 311 | 100 | 120 | 580 | 674 | 86 | 11 | 22 | |
| 7 | 534 | 651 | 82 | 10 | 22 | 341 | 100 | 152 | 533 | 650 | 82 | 11 | 22 | |
| 8 | 524 | <u>570</u> | <u>92</u> | <u>7</u> | 23 | 311 | 100 | 141 | 521 | <u>566</u> | <u>92</u> | <u>7</u> | 22 | Comparative Example |
| 9 | 543 | 617 | 88 | 10 | 24 | <u>134</u> | <u>80</u> | 102 | 540 | 614 | 88 | 9 | 24 | |
| 10 | 538 | 626 | 86 | 8 | 21 | 266 | 100 | 108 | 536 | 623 | 86 | 8 | 22 | |
| 11 | 620 | 674 | <u>92</u> | <u>5</u> | <u>19</u> | 277 | 100 | 114 | 617 | 671 | <u>92</u> | <u>6</u> | 20 | |
| 12 | 569 | 677 | 84 | <u>6</u> | <u>17</u> | 269 | 100 | 138 | 567 | 675 | 84 | <u>7</u> | <u>18</u> | |
| 13 | 588 | 646 | <u>91</u> | <u>6</u> | <u>18</u> | 274 | 100 | 104 | 586 | 644 | <u>91</u> | <u>7</u> | <u>19</u> | |
| 14 | 572 | 657 | 87 | 8 | <u>18</u> | 266 | 100 | 122 | 570 | 655 | 87 | <u>8</u> | <u>18</u> | |
| 15 | 621 | 675 | <u>92</u> | <u>7</u> | 22 | 288 | 100 | 133 | 626 | 673 | <u>93</u> | <u>7</u> | 23 | |
| 16 | 535 | <u>588</u> | <u>91</u> | <u>7</u> | <u>18</u> | 278 | 100 | 103 | 533 | <u>586</u> | <u>91</u> | <u>7</u> | <u>18</u> | |
| 17 | 544 | 664 | 82 | 9 | <u>19</u> | 245 | 100 | <u>19</u> | 542 | 661 | 82 | 9 | <u>19</u> | |

Annotation: Underlined value is out of the range.
Annotation: Tensile test was performed according to GOST (long gauge length).

The target ranges regarding the base metal of a pipe are: a tensile strength of 590 MPa or more, an elongation of 20% or more, and a ratio of a 0.5%-proof stress to a tensile strength of 90% or less, where all of those were determined ageing treatment at a temperature of 250° C. for 30 minutes, each of these examples had a high tensile strength of 590 MPa or more, a low yield ratio of 90% or less and a high elongation of 20% or more and, further, the toughness of a base metal and in a weld heat affected zone thereof were good.

On the other hand, in the case of the Comparative Examples Nos. 8 through 14, the chemical compositions were in our range, but the manufacturing methods were out of our range. As a result, the microstructures were out of our range, and the yield ratio or elongation was insufficient or the sufficient strength or toughness was not obtained in both conditions of before and after a strain ageing treatment at a temperature of 250° C. for 30 minutes. In Nos. 15 through 17, since the chemical compositions were out of our range, the yield ratio and uniform elongation of No. 15 were out of our range, and the tensile strength, yield ratio, uniform elongation, and elongation of No. 16 were all out of our range. The elongation and toughness in a weld heat affected zone of No. 17 were out of our range.

The invention claimed is:

1. A high strength steel plate having a low yield ratio, the steel plate having a chemical composition containing, by mass %, C: 0.03% or more and 0.08% or less, Si: 0.01% or more and 1.0% or less, Mn: 1.2% or more and 3.0% or less, P: 0.015% or less, S: 0.005% or less, Al: 0.08% or less, Nb: 0.005% or more and 0.07% or less, Ti: 0.005% or more and 0.025% or less, N: 0.010% or less, O: 0.005% or less and the balance being Fe and inevitable impurities, a metallographic structure being a dual-phase structure consisting of a bainite phase and island martensite, wherein an area fraction of island martensite is 3% or more and 15% or less, wherein an equivalent circle diameter of the island martensite is 3.0 µm or less, and wherein the remainder of the metallographic structure is a bainite phase, a hardness variation in a thickness direction of ΔHV30 or less in terms of Vickers hardness, a hardness variation in a width direction of ΔHV30 or less in terms of Vickers hardness, a maximum hardness in surface portions of the steel plate of HV230 or less in terms of Vickers hardness and a yield ratio of 85% or less and an elongation of 22% or more in a full-thickness tensile test using a test piece having a shape in accordance with GOST standards.

2. The steel plate according to claim 1, wherein the chemical composition further comprises, by mass %, one or more selected from among Cu: 0.5% or less, Ni: 1% or less, Cr: 0.5% or less, Mo: 0.5% or less, V: 0.1% or less, Ca: 0.0005% or more and 0.003% or less and B: 0.005% or less.

3. A method of manufacturing a high strength steel plate having a low yield ratio comprising:
heating steel having the chemical composition according to claim 2 at a temperature of 1000° C. or higher and 1300° C. or lower,
performing hot rolling under conditions such that the cumulative rolling reduction ratio is 50% or more in a temperature range of 900° C. or lower,
finishing hot rolling at a temperature equal to or higher than the $Ar_3$ transformation point,
starting cooling at a temperature equal to or higher than the $Ar_3$ transformation point,
performing cooling at a cooling rate of 150° C./sec. or less in terms of a surface temperature of the steel plate until the surface temperature becomes 600° C. or lower,
performing cooling at a cooling rate of 15° C./sec. or more in terms of the average temperature of the steel plate until the average temperature becomes 450° C. or higher and 650° C. or lower, and,
immediately after the cooling has been performed, performing reheating at a heating rate of 1.0° C./sec. or more in terms of the surface temperature of the steel plate until the surface temperature becomes 550° C. or higher and 750° C. or lower.

4. A high strength welded steel pipe, the steel pipe being manufactured by forming the steel plate according to claim 2 into a cylindrical shape, by welding butted portions of the shaped cylinder under conditions such that single-layer welding is performed on each of the outer and inner surfaces, and by thereafter performing a pipe-expanding treatment under a condition of a pipe expanding ratio of 0.4% or more and 2.0% or less, and having a yield ratio of 90% or less and an elongation of 20% or more in a full-thickness tensile test using a test piece having a shape in accordance with GOST standards.

5. The high strength welded steel pipe according to claim 4, wherein the steel pipe is strain aged under conditions such that the temperature is 250° C. or lower and the duration is 30 minutes or less.

6. A method of manufacturing a high strength steel plate having a low yield ratio comprising:
heating steel having the chemical composition according to claim 1 at a temperature of 1000° C. or higher and 1300° C. or lower,
performing hot rolling under conditions such that cumulative rolling reduction ratio is 50% or more in a temperature range of 900° C. or lower,
finishing hot rolling at a temperature equal to or higher than the $Ar_3$ transformation point,
starting cooling at a temperature equal to or higher than the $Ar_3$ transformation point,
performing cooling at a cooling rate of 150° C./sec. or less in terms of a surface temperature of the steel plate until the surface temperature becomes 600° C. or lower,
performing cooling at a cooling rate of 15° C./sec. or more in terms of the average temperature of the steel plate until the average temperature becomes 450° C. or higher and 650° C. or lower, and,
immediately after the cooling has been performed, performing reheating at a heating rate of 1.0° C./sec. or more in terms of the surface temperature of the steel plate until the surface temperature becomes 550° C. or higher and 750° C. or lower.

7. A high strength welded steel pipe, the steel pipe being manufactured by forming the steel plate according to claim 1 into a cylindrical shape, by welding butted portions of the shaped cylinder under conditions such that single-layer welding is performed on each of the outer and inner surfaces, and by thereafter performing a pipe-expanding treatment under a condition of a pipe expanding ratio of 0.4% or more and 2.0% or less, and having a yield ratio of 90% or less and an elongation of 20% or more in a full-thickness tensile test using a test piece having a shape in accordance with GOST standards.

8. The high strength welded steel pipe according to claim 7, wherein the steel pipe is strain aged under conditions such that the temperature is 250° C. or lower and the duration is 30 minutes or less.

* * * * *